(12) United States Patent
Tsai (10) Patent No.: US 8,281,150 B2
(45) Date of Patent: Oct. 2, 2012

(54) SMART CARD AND ACCESS METHOD THEREOF

(75) Inventor: Lin-Jiun Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 321 days.

(21) Appl. No.: 12/628,775

(22) Filed: Dec. 1, 2009

(65) Prior Publication Data

US 2011/0119497 A1    May 19, 2011

(30) Foreign Application Priority Data

Nov. 16, 2009   (TW) ................................ 98138824 A (51) Int. Cl.
*G06F 21/00* (2006.01)

(52) U.S. Cl. ................ 713/185; 726/2; 726/9; 707/705; 707/784; 705/51; 705/55; 705/56

(58) Field of Classification Search ................ 726/2, 9; 713/185; 235/382, 492; 707/705, 784; 705/51, 705/55–56

See application file for complete search history.

(56) References Cited

U.S. PATENT DOCUMENTS 7,475,812 B1 * 1/2009 Novozhenets et al. ....... 235/382
8,052,060 B2 * 11/2011 Yacoub et al. ................ 235/492

OTHER PUBLICATIONS

Jorge Ferrari,Smart Cards: A Case Study, Oct. 7, 1998,An IBM Redbooks Publication.*
Wen-Pinn Fang,Offline QR Code Authorization Based on Visual Cryptography,Intelligent Information Hiding and Multimedia Signal Processing (IIH-MSP), 2011 Seventh International Conference,Nov. 17, 2011, pp. 89-92.*
Public-Key Cryptography for RFID-Tags;Batina, L.; Guajardo, J.; Kerins, T.; Mentens, N.; Tuyls, P.; Verbauwhede, I. Pervasive Computing and Communications Workshops, 2007. PerCom Workshops '07. Fifth Annual IEEE International Conference on (0-7695-2788-4);2007. p. 217-222.*

* cited by examiner

*Primary Examiner* — Taghi Arani
*Assistant Examiner* — Angela Holmes
(74) *Attorney, Agent, or Firm* — Patteson Thuente Christensen Pedersen, P.A.

(57) ABSTRACT

A smart card and an access method thereof for use with a smart card management system are provided. The smart card management system comprises a smart card access apparatus and a card server. The smart card access apparatus is electrically connected to the smart card. The smart card is configured to store a plurality of application data and management information corresponding to the application data. The smart card access apparatus may transmit a modification signal of a user to the smart card. The smart card may modify the management information according to the modification signal to generate modified management information when the smart card access apparatus is disconnected from the card serve. Therefore, the contents of the smart card may be managed when the smart card access apparatus is disconnected from the card server.

8 Claims, 6 Drawing Sheets

FIG. 1

| Applet Name | Applet ID | Readable | Writable | Configurable |
|---|---|---|---|---|
| applet A | 000A0A0A | true | true | true |
| applet B | 000A0A0B | true | true | true |
| applet C | 000A0A0C | true | true | false |

SMART CARD AND ACCESS METHOD THEREOF

This application claims priority to Taiwan Patent Application No. 098138824 filed on Nov. 16, 2009.

CROSS-REFERENCES TO RELATED APPLICATIONS

Not applicable.

BACKGROUND OF THE INVENTION

1. Field of the Invention

The present invention relates to a smart card and an access method thereof. More specifically, the present invention relates to a smart card and an access method thereof for use with a smart card management system.

2. Descriptions of the Related Art

In recent years, as the smart card technology is matured increasingly, applications thereof become diversified accordingly. The most commonly found application of smart cards in the daily life is the Easy card system that is indispensable to metro or bus transportation. Besides, smart cards have also been found widely in e-business, access control applications and various electronic products.

According to the current smart card system architecture, a smart card system typically comprises a card server, a smart card access apparatus (e.g., a card reader) and a smart card. The smart card access apparatus may be connected to the card server via a network. The smart card may be electrically connected to the smart card access apparatus to interact with the card server via the smart card access apparatus. The smart card is configured to store therein various transaction data, private information and so on. To ensure that the various data stored in the smart card is prevented from being stolen by an illegal user, the conventional smart card system protects the smart card through the following management mechanism.

Generally, both the card server and the smart card have an authentication key stored therein, and in consideration of safety concerns, the keys are not stored in the smart card access apparatus. If a user desires to operate or process data stored in the smart card via the smart card access apparatus, an authentication process shall be carried out between the smart card and the card server by means of the respective keys they have, so as to identify that the user is a legal user who is allowed to operate or process the data stored in the smart card.

In other words, as restricted by the fact that the keys can only be stored in the card server and the smart card, this authentication process can only be accomplished when the card server and the smart card access apparatus are connected. However, in real life, to keep the card server and the smart card access apparatus that is used over the counter connected at any time is somewhat difficult and wastes the connection resources. Moreover, the most widely used multi-application smart card global platform has not provided an effective solution for off-line smart card authentication yet.

Accordingly, an urgent need exists in the art to provide a solution that may still protect and manage data stored in a smart card effectively when the smart card access apparatus is disconnected from the card server.

SUMMARY OF THE INVENTION

An objective of the present invention is to provide a smart card. The smart card is adapted for use with a smart card management system. The smart card management system comprises a smart card access apparatus and a card server. The smart card access apparatus is electrically connected with the smart card and adapted to transmit a modification signal of a user. The smart card comprises a transmission interface, a storage unit and a microprocessor. The transmission interface is electrically connected to the smart card access apparatus and configured to receive the modification signal. The storage unit is configured to store a plurality of application data and management information corresponding to the application data. The microprocessor is electrically connected to the storage unit and the transmission interface, and configured to modify the management information according to the modification signal to generate modified management information when the smart card access apparatus is disconnected from the card server.

Another objective of the present invention is to provide an access method for a smart card. The smart card is adapted for use with a smart card management system. The smart card management system comprises a smart card access apparatus and a card server. The smart card access apparatus is electrically connected with the smart card and adapted to transmit a modification signal of a user. The smart card comprises a transmission interface, a storage unit and a microprocessor. The microprocessor is electrically connected to the storage unit and the transmission interface, and the transmission interface is electrically connected to the smart card access apparatus. The storage unit is configured to store a plurality of application data and management information corresponding to the application data. The access method comprises the following steps of: enabling the transmission interface to receive the modification signal; and enabling the microprocessor to modify the management information according to the modification signal to generate modified management information when the smart card access apparatus is disconnected from the card server.

In summary, the present invention is characterized in that, when a smart card access apparatus is disconnected from a card server, the smart card may modify the management information according to the modification signal to generate modified management information. In this way, the prevent invention may overcome the drawback of the prior art that the management information stored in the smart card may only be modified when the smart card access apparatus is connected to the card server.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments.

Therefore, description of these embodiments is only for purpose of illustration rather than limitation to the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
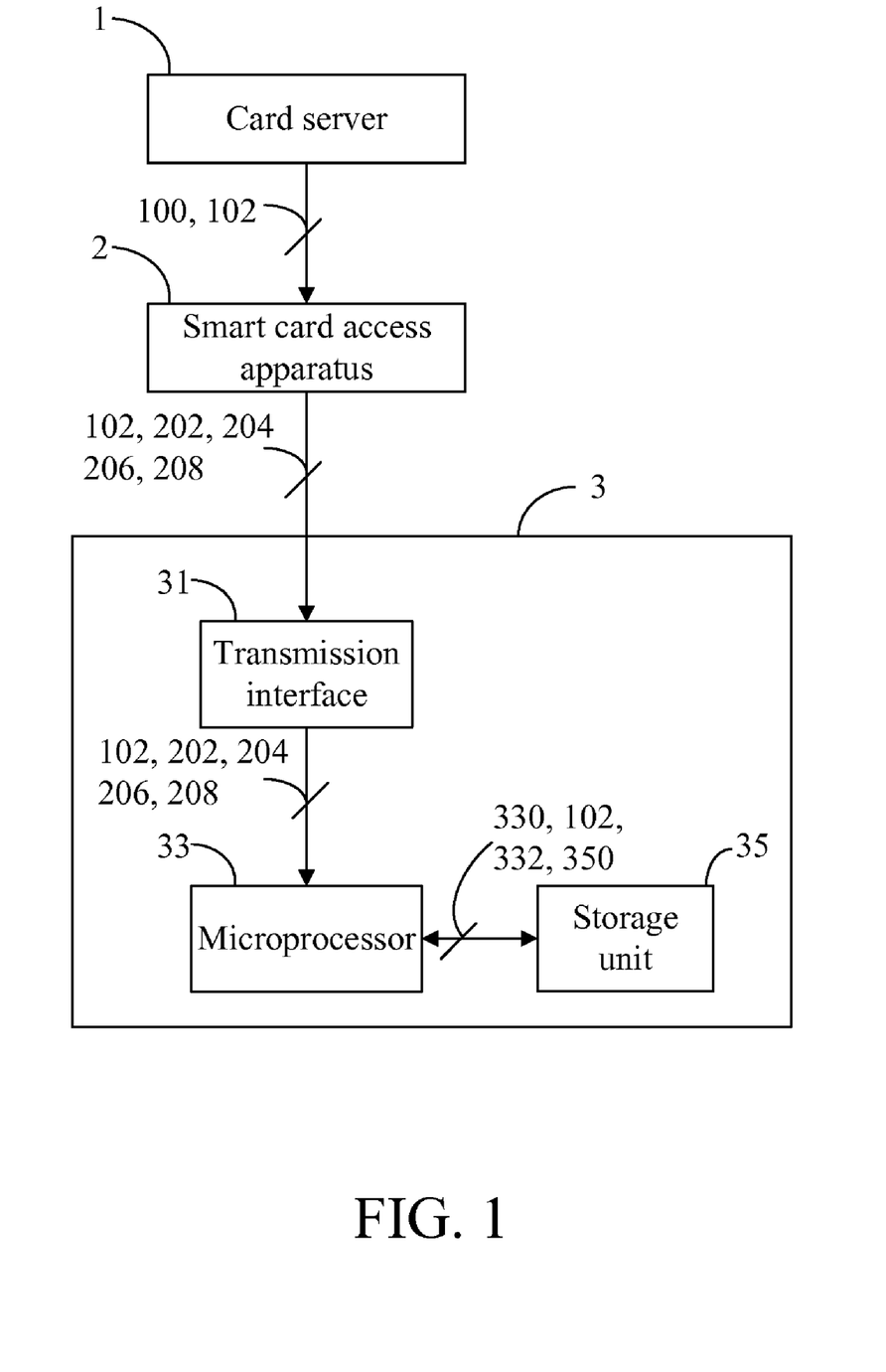
FIG. 1 is a schematic view of a first embodiment of the present invention.

A first embodiment of the present invention is shown in FIG. 1, which is a schematic view of a smart card management system. As can be seen from FIG. 1, the smart card management system comprises a card server 1, a smart card access apparatus 2 and a smart card 3. The smart card access apparatus 2 may be connected to the card server 1 via a network. The smart card 3 is electrically connected to the smart card access apparatus 2 to interact with the card server 1 via the smart card access apparatus 2. In this embodiment, the smart card access apparatus 2 is a cell phone; however, in other embodiments, the smart card access apparatus 2 may also be a card reader or other apparatuses that may access the smart card 3, and this is not intended to limit scope of the present invention.

As can be seen from FIG. 1, the smart card 3 comprises a transmission interface 31, a microprocessor 33 and a storage unit 35. The smart card 3 is electrically connected to the smart card access apparatus 2 via the transmission interface 31, and the microprocessor 33 is electrically connected to the transmission interface 31 and the storage unit 35. The storage unit 35 currently stores a plurality of application data 350. How the card server 1, the smart card access apparatus 2 and the smart card 3 interact with each other will be described hereinbelow.

When an on-line status is presented between the smart card reading apparatus 2 and the card server 1, the smart card access apparatus 2 may receive from the card server 1 a management tool 100 and management information 102 corresponding to the plurality of application data 350, install the management tool 100 and transmit the management information 102 to the smart card 3. The microprocessor 33 of the smart card 3 may receive the management information 102 via the transmission interface 31 and store the management information 102 into the storage unit 35 for subsequent use. It shall be noted that, the management tool 100 is configured to impart the smart card access apparatus 2 an ability to access the smart card 3. Hereinafter, any access made by the smart card access apparatus 2 to the smart card 3 is accomplished by the management tool 100; this may be readily understood by those of ordinary skill in the art, and thus will not be further described herein.

In this embodiment, the plurality of application data 350 comprises application data associated with an e-purse, a credit card and an Easy card, and the management information 102 comprises application data names, application data IDs, application data access rights and other information associated with the application data 350. In other embodiments, rather than being limited thereto, the management information 102 and the plurality of application data 350 may also comprise other additional application data and associated application information therein depending on practical needs.

Figure 2:
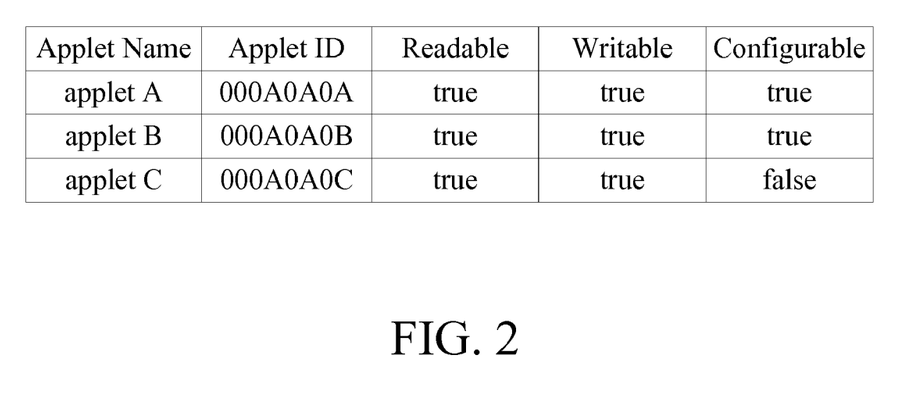
FIG. 2 is a schematic view illustrating a structure of management information of the present invention.

For convenience of the following description, reference is made to FIG. 2, which is a schematic view of a structure of the management information 102. In FIG. 2, the field Applet Name stores application data names of the application data, which are applet A (e-purse), applet B (credit card) and applet C (Easy card) respectively; the field Applet ID stores IDs of the application data, which are 000A0A0A, 000A0A0B and 000A0A0C respectively; the fields Readable, Writable and Configurable are configured to specify access rights of the application data, which respectively represent whether to allow an application datum to be activated, whether to allow an application datum to be modified and stored, and whether to allow an access right of an application datum to be modified. For these access rights, a setting value of True means "allowed" while a setting value of False means "not allowed".

After receiving the management tool 100 and the management information 102 from the card server 1, the smart card access apparatus 2 may be disconnected from the card server 1 to present an off-line status. Of course, whether the smart card access apparatus 2 shall be disconnected from the card server 1 depends on requirements in practical use. However, to highlight the technical characteristics of the present invention, interactions between the smart card access apparatus 2 and the smart card 3 to be described hereinafter will all be accomplished under the off-line status in which the smart card access apparatus 2 is disconnected from the card server 1.

When a user who gets the smart card 3 and desires to access the management information 102 and the application data 350 of the smart card 3 via the smart card access apparatus 2, the user must establish off-line authentication information in the storage unit 35 of the smart card 3 via the smart card access apparatus 2 as a measure to protect the management information 102 and the application data 350. For this purpose, the user may transmit a setting signal 202 to the smart card 3 via the smart card access apparatus 2. The transmission interface 31 of the smart card receives the setting signal 202 and transmits it to the microprocessor 33, which then generates off-line authentication information 330 according to the setting signal 202 and stores the off-line authentication information 330 into the storage unit 35. In this embodiment, once the off-line authentication information 330 is established, the user must pass through authentication of the off-line authentication information 330 whenever the user desires to access any data of the smart card 3, and the setting signal 202 is a password. In other embodiments, whether the user must pass through authentication of the off-line authentication information 330 whenever the user desires to access any data of the smart card 3 depends on the practical use, and the setting signal 202 may also be other information available for authentication such as fingerprint information, vocal print information and the like, and this is not intended to limit scope of the present invention.

After the off-line authentication information 330 is established, if the user desires to operate the smart card 3, the user may transmit an input signal 204 via the smart card access apparatus 2 to the smart card 3. The transmission interface 31 of the smart card 3 receives the input signal 204 and transmits it to the microprocessor 33, which then determines whether the user is a legal user according to the input signal 204 and the off-line authentication information 330. In more detail, the input signal 204 incorporates a password currently inputted by the user, and the microprocessor 33 determines whether the password currently inputted is consistent with that incorporated in the off-line authentication information 330. If they are consistent with each other, it means that the user is a legal user; otherwise, if they are inconsistent with each other, the smart card 3 will deny any access by the smart card access apparatus 3.

If it is determined that the user is a legal user, the microprocessor 33 will read the management information 102 and transmit it to the smart card access apparatus 2 via the transmission interface 31 so that the management information 102 may be presented by the smart card access apparatus 2 to the user for use in further operations.

If the legal user desires to perform further operations on the smart card 3, the legal user may transmit an operation signal 208 to the smart card 3 via the smart card access apparatus 2. The transmission interface 31 of the smart card 3 receives the operation signal 208 and transmits it to the microprocessor 33, which then determines whether an application datum corresponding to the operation signal 208 is allowed to be accessed according to the operation signal 208 and the management information 102. If the corresponding application datum is allowed to be accessed, then the microprocessor 33 retrieves the corresponding application datum from the plurality of application data 350 and further makes a corresponding processing on the corresponding application datum according to operation signal 208; otherwise, if the corresponding application datum is not allowed to be accessed, then the microprocessor 33 denies any access to the corresponding application datum.

For example, assuming that the legal user desires to activate the application datum applet A, the legal user may transmit an operation signal 208 to the smart card 3 via the smart card access apparatus 2. The transmission interface 31 of the smart card 3 receives the operation signal 208 and transmits it to the microprocessor 33, which then determines whether the application datum applet A is allowed to be activated according to the operation signal 208 and the management information 102. According to the management information 102 shown in FIG. 2, the field Readable of the application datum applet A has a value of True, which means that the application datum applet A is allowed to be activated. Accordingly, the microprocessor 33 will retrieve the application datum applet A and activate it according to the operation signal 208. On the other hand, if the field Readable of the application datum applet A in the management information 102 has a value of False, the microprocessor 33 will deny activation of the application datum applet A.

Furthermore, if the legal user desires to modify the management information 102, the legal user may further transmit a modification signal 206 to the smart card 3 via the smart card access apparatus 2. The transmission interface 31 of the smart card 3 receives the modification signal 206 and transmits it to the microprocessor 33. The microprocessor 33 then modifies the management information 102 according to the modification signal 206 to generate modified management information 332, and stores the modified management information 332 into the storage unit 35 to overwrite the management information 102.

For example, if the legal user desires to modify the Readable right of the application datum applet A into a value of False, the legal user may further transmit a modification signal 206 to the smart card 3 via the smart card access apparatus 2. The transmission interface 31 of the smart card 3 receives the modification signal 206 and transmits it to the microprocessor 33. The microprocessor 33 then modifies the field Readable of the application datum applet A of the management information 102 into a value of False according to the modification signal 206 to generate modified management information 332, and stores the modified management information 332 into the storage unit 35 to overwrite the management information 102.

FIGS. 3A-3D show a second embodiment of the present invention, which is an access method for the smart card as described in the first embodiment and may be used with the smart card access apparatus and the card server as described in the first embodiment. In more detail, the smart card access apparatus may be connected to the card server via a network, and the smart card may be electrically connected to the smart card access apparatus to interact with the card server via the smart card access apparatus. In this embodiment, the smart card access apparatus is a cell phone; however, in other embodiments, the smart card access apparatus may also be a card reader or other apparatuses that may access the smart card, and this is not intended to limit scope of the present invention.

More specifically, the smart card comprises a transmission interface, a microprocessor and a storage unit. The transmission interface is electrically connected to the smart card access apparatus, and the microprocessor is electrically connected to the transmission interface and the storage unit. The storage unit currently stores a plurality of application data. When an on-line status is presented between the smart card reading apparatus and the card server present, the smart card access apparatus may receive from the card server a management tool and management information corresponding to the plurality of application data. Hereinafter, any access made by the smart card access apparatus to the smart card is accomplished by the management tool, and the aforesaid on-line status may be accomplished in a wireless or wired way; these may be readily understood by those of ordinary skill in the art, and thus will not be further described herein.

Figure 3A:
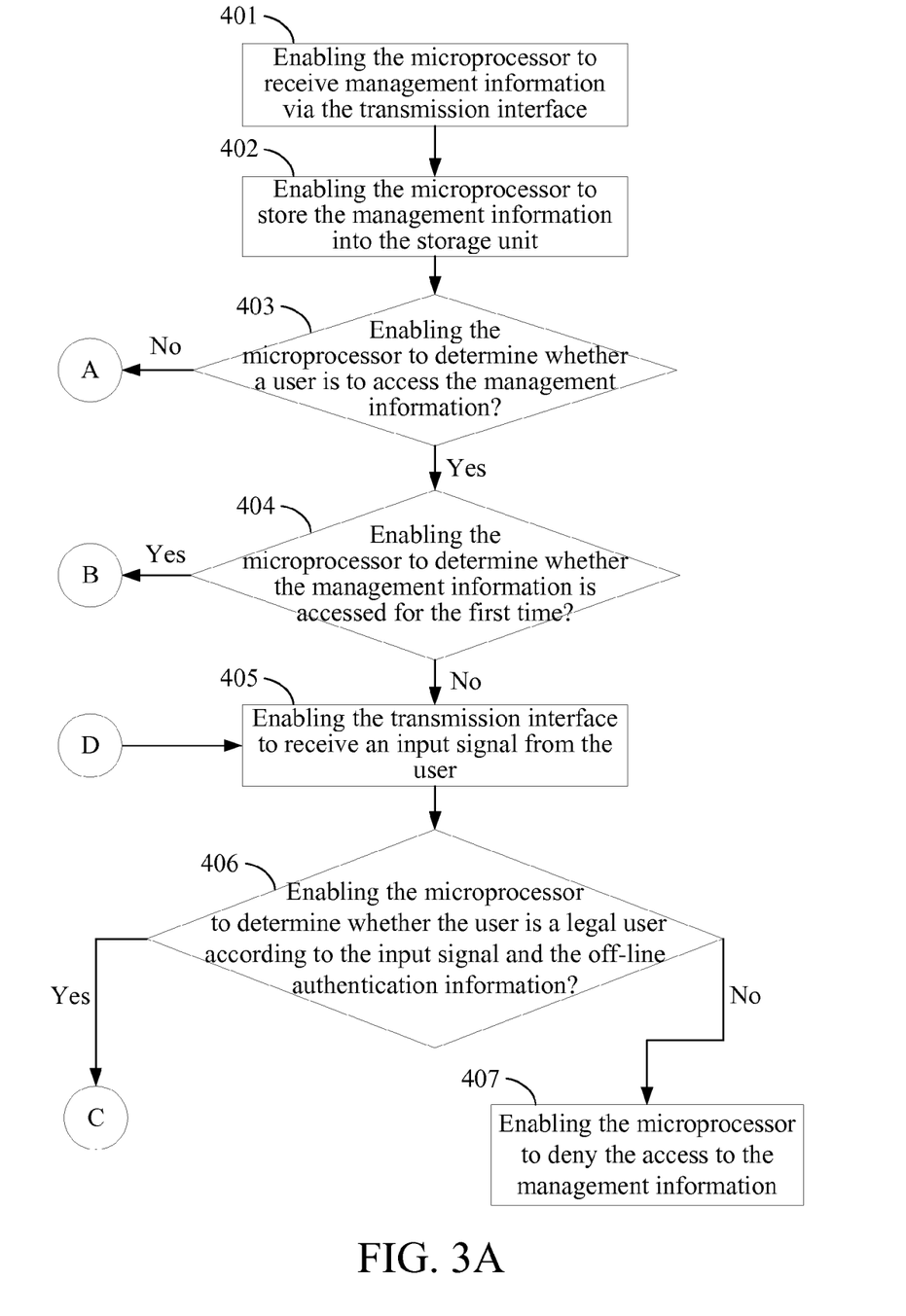
FIGS. 3A-3D are a flowchart of a second embodiment of the present invention.

The access method of the second embodiment comprises the following steps. Referring to FIG. 3A at first, step 401 is executed to enable the microprocessor to receive the management information via the transmission interface, and step 402 is executed to enable the microprocessor to store the management information into the storage unit for subsequent use.

In this embodiment, the plurality of application data comprises application data associated with an e-purse, a credit card and an Easy card, and the management information comprises application data names, application data IDs, application data access rights and other information associated with the application data. In other embodiments, rather than being limited thereto, the management information and the plurality of application data may also comprise other additional application data and associated application information therein depending on practical needs.

For convenience of the following description, reference is made to FIG. 2, which is a schematic view of a structure of the management information. In FIG. 2, the field Applet Name stores application data names of the application data, which are applet A (e-purse), applet B (credit card) and applet C (Easy card) respectively; the field Applet ID stores IDs of the application data, which are 000A0A0A, 000A0A0B and 000A0A0C respectively; the fields Readable, Writable and Configurable are configured to specify access rights of the application data, which respectively represent whether to allow an application datum to be activated, whether to allow an application datum to be modified and stored, and whether to allow an access right of an application datum to be modified. For these access rights, a setting value of True means "allowed" while a setting value of False means "not allowed".

After receiving the management tool and the management information from the card server, the smart card access apparatus may be disconnected from the card server to present an off-line status. Of course, whether the smart card access apparatus shall be disconnected from the card server depends on requirements in practical use. However, to highlight the technical characteristics of the present invention, interactions between the smart card access apparatus and the smart card to be described hereinafter will all be accomplished under the off-line status in which the smart card access apparatus is disconnected from the card server.

Next, referring to FIG. 3A, step 403 is executed to enable the microprocessor to determine whether a user is to access the management information. If not, then referring to FIG.

Figure 3B:
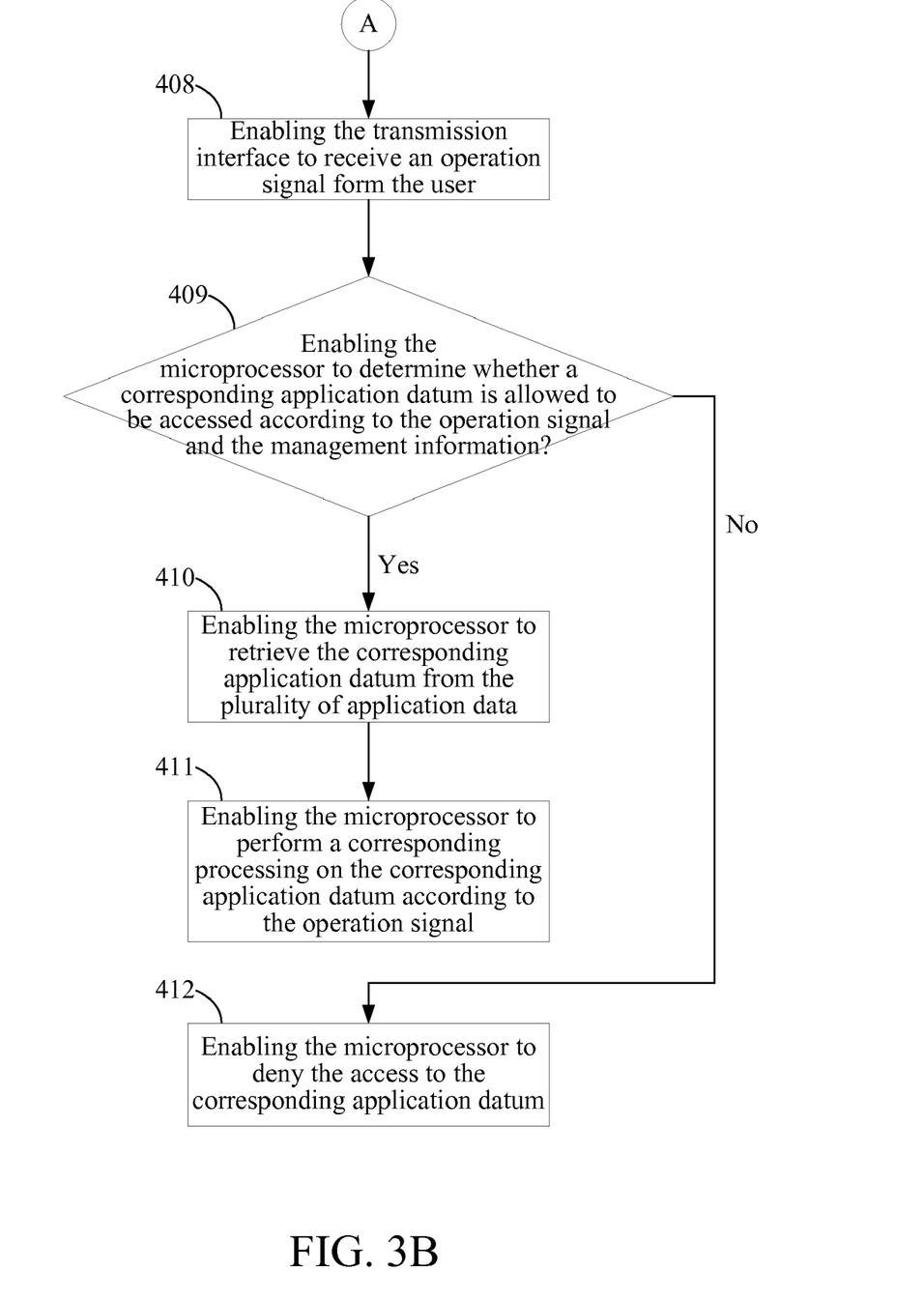

3B, step 408 is executed to enable the transmission interface to receive an operation signal form the user. Then, step 409 is executed to enable the microprocessor to determine whether a corresponding application datum is allowed to be accessed according to the operation signal and the management information. If it is not allowed, then step 412 is executed to enable the microprocessor to deny the access to the corresponding application datum; otherwise, if it is allowed, step 410 is executed to enable the microprocessor to retrieve the corresponding application datum from the plurality of application data, and then step 411 is executed to enable the microprocessor to perform a corresponding processing on the corresponding application datum according to the operation signal.

For example, if the user desires to activate the application datum applet A, then the microprocessor determines in step 403 that the user is not to access the management information. Then step 408 is executed to enable the transmission interface to receive an operation signal from the user, and step 409 is executed to enable the microprocessor to determine whether a corresponding application datum is allowed to be accessed according to the operation signal and the management information. In this example, step 409 is to enable the microprocessor to determine whether the application datum applet A is allowed to be activated according to the operation signal and the management information. According to the management information 102 shown in FIG. 2, the field Readable of the application datum applet A has a value of True, which means that the application datum applet A is allowed to be activated. Hence, step 410 is executed to enable the microprocessor to retrieve the application datum applet A from the plurality of application data, and step 411 is executed to enable the microprocessor to perform a corresponding processing on the application datum applet A according to the operation signal (i.e., to activate the application datum applet A in this example). Otherwise, if the field Readable of the application datum applet A has a value of False, then step 412 is executed to enable the microprocessor to deny the access to the application datum applet A (i.e., to deny activation of the application datum applet A in this example).

Referring back to FIG. 3A, if it is determined in step 403 that the user is to access the management information, then step 404 is executed to enable the microprocessor to determine whether the management information is accessed for the first time. If yes, then referring to FIG. 3C, step 413 is executed to enable the transmission interface to receive a setting signal from the user, and step 414 is executed to enable the microprocessor to generate off-line authentication information according to the setting signal. Thereafter, step 415 is executed to enable the microprocessor to store the off-line authentication information into the storage unit. In this embodiment, the setting signal is a password; however, in other embodiments, the setting signal may also be other information available for authentication such as fingerprint information, vocal print information and the like, and this is not intended to limit scope of the present invention.

Figure 3C:
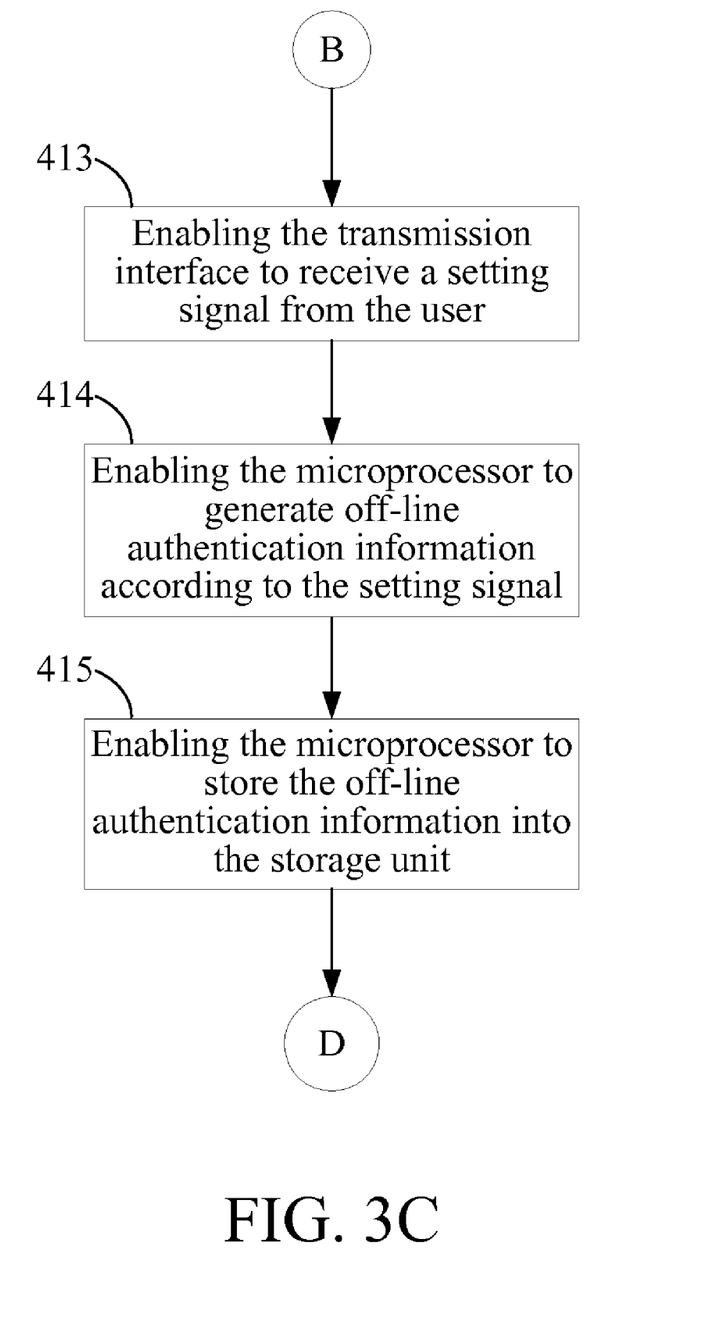

Upon completion of step 415 or if it is determined in step 404 that the management information is not accessed for the first time, then step 405 is executed to enable the transmission interface to receive an input signal from the user. Subsequently, step 406 is executed to enable the microprocessor to determine whether the user is a legal user according to the input signal and the off-line authentication information. If the user is not a legal user, then step 407 is executed to enable the microprocessor to deny the access to the management information.

In more detail, the input signal comprises a password currently inputted by the user, and the microprocessor will determine whether the password currently inputted by the user is consistent with a password incorporated in the off-line authentication information. If they are consistent with each other, it means that the user is a legal user; otherwise, if they are inconsistent with each other, the smart card will deny to be accessed by the smart card access apparatus.

Figure 3D:
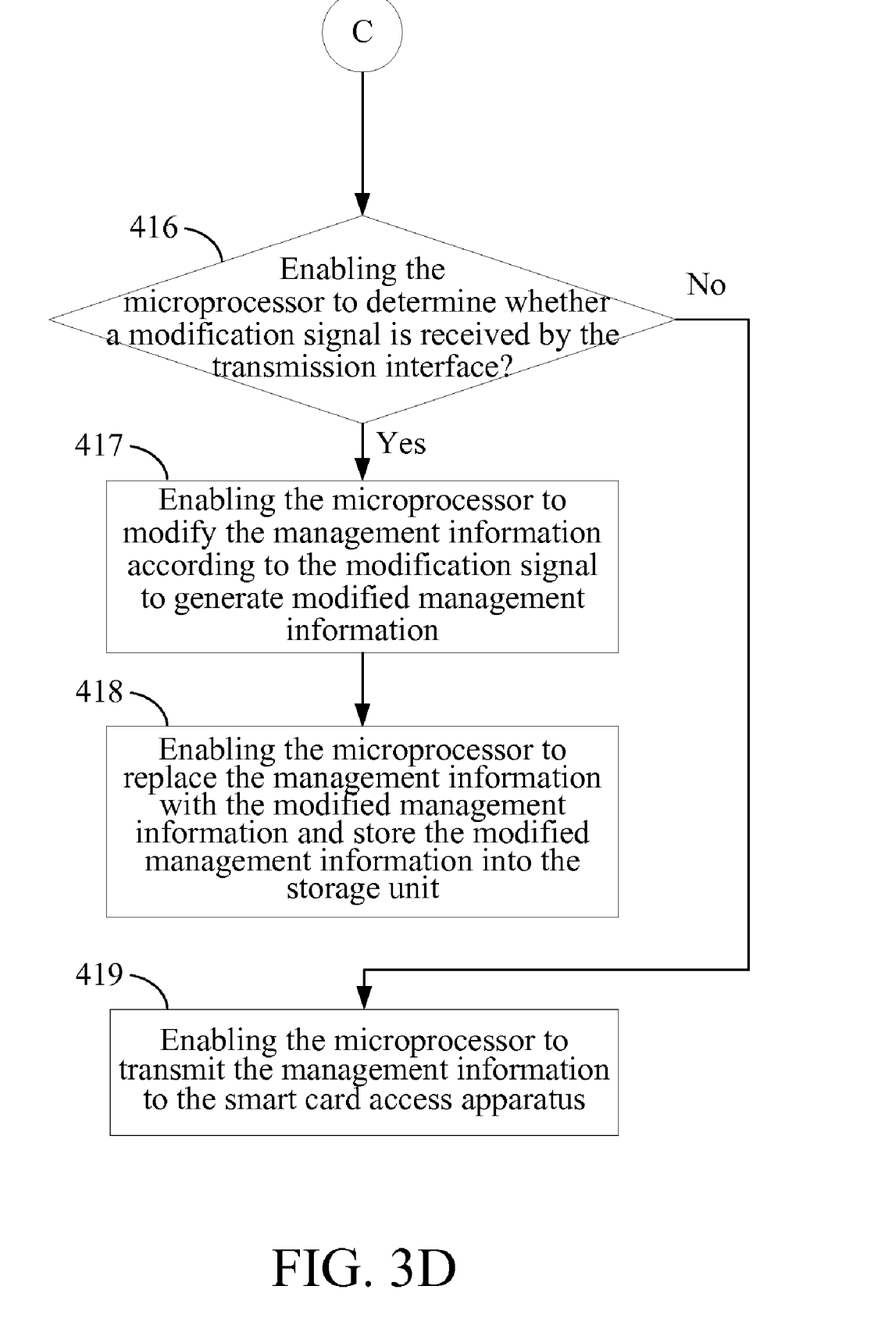

If it is determined in step 406 that the user is a legal user, then referring to FIG. 3D, step 416 is executed to enable the microprocessor to determine whether an modification signal is received by the transmission interface. If not, then step 419 is executed to enable the microprocessor to transmit the management information to the smart card access apparatus; otherwise, if yes, then step 417 is executed to enable the microprocessor to modify the management information according to the modification signal to generate modified management information, and step 418 is executed to enable the microprocessor to replace the management information with the modified management information and store the modified management information into the storage unit.

For example, assuming that a legal user desires to modify the Readable right of the application datum applet A into a value of False, then in step 417, the microprocessor modifies the management information according to the modification signal to generate modified management information. In this example, this is to enable the microprocessor to modify the Readable right of the applet A of the management information into a value of False, thereby to generate modified management information. Then step 418 is executed to enable the microprocessor to replace the management information with the modified management information and store the modified management information into the storage unit.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above description, the present invention is characterized in that, when a smart card access apparatus is disconnected from a card server, the smart card may modify the management information according to the modification signal to generate modified management information when the smart card access apparatus is disconnected from the card server. In this way, the prevent invention may overcome the drawback of the prior art that the management information stored in the smart card may only be modified when the smart card access apparatus is connected to the card server.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A smart card adapted for use with a smart card management system, the smart card management system comprising a smart card access apparatus and a card server, the smart card access apparatus being electrically connected to the smart card and adapted to transmit a modification signal and an input signal of a user, the smart card comprising:

a transmission interface, being electrically connected to the smart card access apparatus and configured to receive the modification signal and the input signal;

a storage unit, being configured to store a plurality of application data and management information corresponding to the application data and to store off-line authentication information; and a microprocessor, being electrically connected to the storage unit and the transmission interface and configured to identify that the user is a legal user according to the input signal and the off-line authentication information, and to modify the management information according to the modification signal to generate modified management information when the smart card access apparatus is disconnected from the card server.

2. The smart card as claimed in claim 1, wherein the smart card access apparatus is further configured to transmit an operation signal of the user, the transmission interface is further configured to receive the operation signal, the microprocessor is further configured to retrieve a corresponding application datum from the plurality of application data according to the operation signal and the management information, and to perform a corresponding processing on the corresponding application datum according to the operation signal.

3. The smart card as claimed in claim 1, wherein when an on-line status is presented between the smart card access apparatus and the card server, the smart card access apparatus is adapted to receive the management information from the card server, and the microprocessor is further configured to receive the management information via the transmission interface and store the management information into the storage unit.

4. The smart card as claimed in claim 1, wherein the smart card access apparatus is further configured to transmit a setting signal of the user, the transmission interface is further configured to receive the setting signal, and the microprocessor is further configured to generate the off-line authentication information according to the setting signal and store the off-line authentication information into the storage unit.

5. An access method for use in a smart card, the smart card being adapted for use with a smart card management system, the smart card management system comprising a smart card access apparatus and a card server, the smart card access apparatus being electrically connected to the smart card and adapted to transmit a modification signal and an input signal of a user, the smart card comprising a transmission interface, a storage unit and a microprocessor electrically connected to the storage unit and the transmission interface, the transmission interface being electrically connected to the smart card access apparatus, the storage unit being configured to store a plurality of application data and management information corresponding to the application data and to store off-line authentication information, the access method comprising the following steps of:

(A) enabling the transmission interface to receive the input signal;

(B) enabling the microprocessor to identify that the user is a legal user according to the input signal and the off-line authentication information;

(C) enabling the transmission interface to receive the modification signal; and (D) enabling the microprocessor to modify the management information according to the modification signal to generate modified management information when the smart card access apparatus is disconnected from the card server.

6. The access method as claimed in claim 5, wherein the smart card access apparatus is further configured to transmit an operation signal of the user, the access method further comprises the following steps of:

enabling the transmission interface to receive the operation signal;

enabling the microprocessor to retrieve a corresponding application datum from the plurality of application data according to the operation signal and the management information; and enabling the microprocessor to perform a corresponding processing on the corresponding application datum according to the operation signal.

7. The access method as claimed in claim 5, wherein when an on-line status is presented between the smart card access apparatus and the card server, the smart card access apparatus is adapted to receive the management information from the card server, the access method further comprises the following steps of:

enabling the microprocessor to receive the management information via the transmission interface; and enabling the microprocessor to store the management information into the storage unit.

8. The access method as claimed in claim 5, wherein the smart card access apparatus is further configured to transmit a setting signal of the user, the access method further comprises the following steps of:

enabling the transmission interface to receive the setting signal;

enabling the microprocessor to generate the off-line authentication information according to the setting signal; and enabling the microprocessor to store the off-line authentication information into the storage unit.

* * * * *